No. 876,087. PATENTED JAN. 7, 1908.
J. R. PEIRCE.
STONE CUTTING MACHINE.
APPLICATION FILED MAY 17, 1905.

WITNESSES:
Fred White
René Meune

INVENTOR:
John Hoyden Peirce,
By Attorneys,
Arthur E. Fraser & Co.

UNITED STATES PATENT OFFICE.

JOHN ROYDEN PEIRCE, OF NEW YORK, N. Y., ASSIGNOR TO ROYDEN MARBLE MACHINERY COMPANY, OF NEW YORK, N. Y., A CORPORATION OF NEW JERSEY.

STONE-CUTTING MACHINE.

No. 876,087.  Specification of Letters Patent.  Patented Jan. 7, 1908.

Application filed May 17, 1905. Serial No. 260,792.

*To all whom it may concern:*

Be it known that I, JOHN ROYDEN PEIRCE, a citizen of the United States, residing in the borough of Manhattan, city, county, and State of New York, have invented certain new and useful Improvements in Stone-Cutting Machines, of which the following is a specification.

In previous applications for patent, and especially in application Serial No. 230,863, filed October 31, 1904, I have described in detail certain apparatus and processes involving the use of carborundum or similar crystalline materials in the cutting of stone, and especially the cutting of marble or similar hard stone.

In extensive experiments which I have made with machines of this general type for cutting, molding or similarly working such stones, I have found that it is only by the greatest attention to particular details that the stone can be cut rapidly and efficiently without burning, which burning, as is well understood, destroys the ability to take a high polish. In fact in practice the burned spots have to be ground out, involving considerable delay and expense.

I have found that the tendency to burn may be reduced by tapering the wheels of carborundum or the like from the periphery toward the center. It is advantageous also, and, with the finer grades of carborundum, practically essential, that a copious supply of water should be introduced at the point of contact between the stone and the cutting wheel, and my experiments have shown that a very much higher degree of efficiency in securing sharp arrises on the marble even with coarse wheels is secured if the water be applied in jets directed upon the edges of the periphery. Preferably three jets are employed, two converging upon the edges and one striking directly upon the periphery of the wheel.

The accompanying drawings illustrate the application of the improvements to the coping machine described in my application above referred to.

Figure 1:
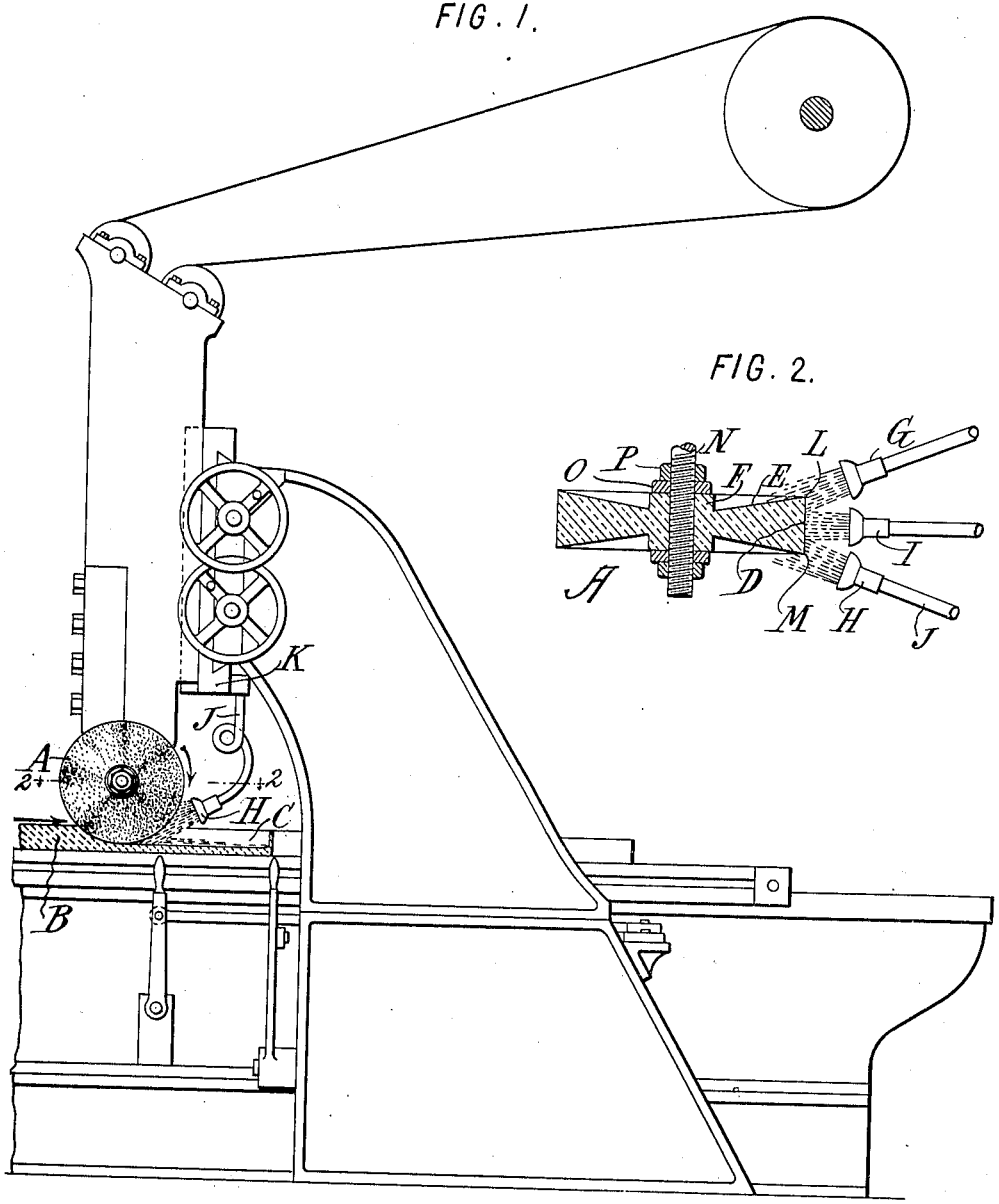
Figure 2:
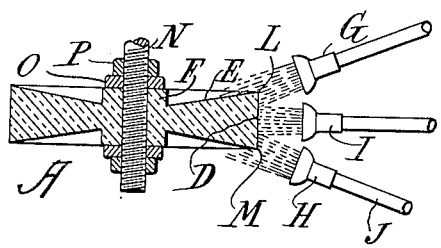

Figure 1 is a side elevation. Fig. 2 is a horizontal section through the cutting wheel.

Referring to the embodiment of the invention illustrated, the cutting wheel A is adjusted up or down or transversely of the machine by mechanism which need not be here described in detail. The slab B of marble or the like is fed to the cutting wheel, the latter being rotated at a high rate of speed to form a cut or channel C in the slab. The wheel is molded integrally from center to periphery of carborundum, and the peripheral face D is made sufficiently wide to permit the side faces E to taper toward the flat-sided central portion F of the wheel.

Nozzles G H and I, preferably in the form of ordinary roses, are connected by suitable pipes J, of lead or the like, to the carriage K. Nozzles G and H direct the jets of water to the edges L and M respectively of the periphery of the wheel and preferably in a converging direction, while the third nozzle I throws a jet directly upon the face of the periphery of the wheel. The jets are all arranged to strike the lower part of the wheel just in the rear of its point of contact with the slab. The jets are thrown with considerable force so as to force the water as far as possible between the wheel and the slab, and the channel C and the hollow in the side of the wheel assist this action by maintaining a supply of water against the wheel. By the use of the lead pipes J the nozzles are adjustable as to angle and position to obtain the best results for different cutting wheels and different conditions. The wheel may be held on its shaft N by means of washers O between the central portion F of the wheel and the clamping nuts P.

The several nozzles may be combined or divided in any way which will secure the desired number and direction of jets or streams of water.

I do not claim in this application the tapered wheel in all its possible applications, but only as an element of a stone-cutting apparatus. It is not to be understood however that I thereby waive my right to claim such wheel by itself in another application.

Though I have described with great particularity of detail a certain specific embodiment of the invention, yet it is not to be understood that the invention is limited to the specific apparatus disclosed. Various modifications thereof may be made in detail and in the arrangement and combination of the parts without departing from the invention.

What I claim is:—

1. A stone-cutting apparatus including a cutting wheel molded integrally from center to periphery of agglomerated carborundum and having its periphery of greater thickness than its sides.

2. A stone-cutting apparatus including a cutting wheel A molded integrally from center to periphery of agglomerated carborundum, having a peripheral face D and side faces E tapering from the peripheral face to the central portion.

3. A stone-cutting apparatus including a cutting wheel A molded integrally from center to periphery of agglomerated carborundum, having a peripheral face D, a flat-sided central portion F, and side faces E tapering from the peripheral face to the central portion.

4. A stone-cutting apparatus including a cutting wheel molded integrally from center to periphery of agglomerated carborundum and having its periphery of greater thickness than its sides, in combination with means for directing jets of water upon the edges of the periphery.

5. A stone-cutting apparatus including a cutting wheel molded integrally from center to periphery of agglomerated carborundrum and having its periphery of greater thickness than its sides, in combination with means for directing jets of water upon the edges and upon the face of the periphery.

In witness whereof, I have hereunto signed my name in the presence of two subscribing witnesses.

JOHN ROYDEN PEIRCE.

Witnesses:
DOMINGO A. USINA,
THEODORE T. SNELL.